(12) United States Patent
Nigh

(10) Patent No.: US 7,913,395 B1
(45) Date of Patent: Mar. 29, 2011

(54) PIPE CUTTER WITH FLUID DIVERTING MEANS AND METHOD OF USE THEREOF

(76) Inventor: Ryan C. Nigh, Draper, UT (US)

( * ) Notice: Subject to any disclaimer, the term of this patent is extended or adjusted under 35 U.S.C. 154(b) by 770 days.

(21) Appl. No.: 11/881,236

(22) Filed: Jul. 26, 2007

(51) Int. Cl.
*B23D 21/08* (2006.01)
*B23D 21/00* (2006.01)

(52) U.S. Cl. .............. 30/101; 30/94; 137/15.14; 83/745

(58) Field of Classification Search .............. 30/94–102; 137/15.14, 15.17, 312, 317, 318, 15.08, 375, 137/377; 138/97; 166/81.1; 83/745
See application file for complete search history.

(56) References Cited

U.S. PATENT DOCUMENTS

| | | | |
|---|---|---|---|
| 1,380,948 A * | 6/1921 | Donnelly et al. ............... 30/101 |
| 4,114,266 A * | 9/1978 | Erpenbeck ...................... 30/123 |
| 4,370,995 A * | 2/1983 | Smith ........................ 137/15.14 |
| 5,224,742 A | 7/1993 | Ooka et al. |
| 5,509,440 A * | 4/1996 | Cantaloube et al. .......... 137/318 |
| 5,651,393 A | 7/1997 | Danowski |
| 5,725,009 A * | 3/1998 | Mallow et al. ............. 137/15.09 |
| 5,732,728 A * | 3/1998 | Maichel ..................... 137/15.14 |
| 6,131,597 A * | 10/2000 | Mendicino et al. ......... 137/15.14 |
| 6,227,232 B1 * | 5/2001 | Williams, Sr. ................ 137/312 |
| 6,416,263 B1 | 7/2002 | Sato |
| 6,508,267 B1 | 1/2003 | Rippolone |
| 6,615,859 B2 * | 9/2003 | Sato et al. ................... 137/15.14 |
| 6,640,825 B2 * | 11/2003 | McAtarian ..................... 137/312 |
| 6,658,739 B1 | 12/2003 | Huang |
| 6,832,624 B1 | 12/2004 | Rippolone |
| 7,013,567 B2 | 3/2006 | Myers |
| 7,089,668 B1 * | 8/2006 | Whitehead ........................ 30/94 |

\* cited by examiner

*Primary Examiner* — Laura M. Lee
(74) *Attorney, Agent, or Firm* — Montgomery Patent and Design; Robert C. Montgomery

(57) ABSTRACT

The invention as presently conceived discloses a plumbing pipe cutter with an integral means of directing away residual water after a pipe is cut. The device comprises a conventional, low profile pipe cutter that is commonly used to cut copper water supply lines. Other cutters designed for polyvinylchloride (PVC) or other types of piping can likewise be adapted. The apparatus is further comprised of a transparent shield around the entire perimeter of the cutter and extending onto either pipe. At one end of the shield, approximately 8-10 inches from the cutter, the transparent material is flexibly gathered and routed to a short section of PVC tubing. The distal end of the tubing has a hose connector onto which a standard hose would be attached. When the apparatus is fully installed, residual water in cut pipes is collected and directed away without harming the surrounding areas.

6 Claims, 5 Drawing Sheets

US 7,913,395 B1

PIPE CUTTER WITH FLUID DIVERTING MEANS AND METHOD OF USE THEREOF

RELATED APPLICATIONS

The present invention was first described in Disclosure Document No. 607,436, filed Oct. 16, 2006, the entire disclosures of which are incorporated herein by reference.

FIELD OF THE INVENTION

This invention relates to pipe cutters and, more particularly, to a pipe cutter that is able to divert water from a pipe that contains water during cutting operations.

BACKGROUND OF THE INVENTION

Various plumbing construction procedures require a variety of specialty tools and parts to provide for a professional appearing installation that meets all applicable building codes. One task associated with almost every plumbing task is the cutting of pipe. Many times such pipe is empty and the cutting is a quick and easy operation. However, in many cases, a connection must be made to a piping system that is filled with water. Even though upstream shutoff valves are closed, water still remains in the pipes, sometimes gallons of it. This is especially the case in basement bathrooms that are roughed in for later finishing. In most cases the water lines are just capped with no shutoffs. In this case, with the main valve closed upstream, all of the water in pipes on the upper floors will drain down into the cut area. This type of cut-in can make a mess out of finished floors and walls.

Several attempts have been made in the past to design an effective means for pipe cutting. U.S. Pat. No. 6,658,739 in the name of Huang discloses a pipe cutter comprised of a fastening mechanism including two pivot members on both sides of a top recess, two bifurcated pivot links, two rollers on top ends of the pivot members, an upper rotary blade, and a lower transmission mechanism. The transmission mechanism is operative to pivot the fastening mechanism for forming a three-point support (i.e., the rollers and the blade) of a pipe to be cut. A number of configurations of the cutter are possible. Unfortunately, this prior art example does not provide a means for diverting fluid from a cut pipe.

U.S. Pat. No. 7,013,567 in the name of Myers discloses a pipe cutter comprised of a rotary head having an axis of rotation, and a housing gear is coaxial with the rotary head such that the housing gear and rotary head have a common axis of rotation. A pipe slot extends into the rotary head and the housing gear, and a pipe cradle is provided in the pipe slot and serves to receive a pipe. A cutting wheel is associated with the rotary head and a wheel biasing member urges the cutting wheel to extend into the pipe slot. A primary drive source is operatively connected to the housing gear by a gear system that rotates the housing gear and the rotary head about the common axis of rotation. Because the cutting wheel is biased to extend into the pipe slot and contacts a pipe placed therein, the cutting wheel revolves around the pipe and cuts into the pipe during rotation of the rotary head. The primary drive source may be manual or automated. Unfortunately, this prior art example does not provide a means for diverting fluid from a cut pipe.

U.S. Pat. No. 6,637,115 in the name of Walsh describes a cutting head for a portable, hand-held, power-operated pipe cutter that is constructed with at least one channel in a rotating mounting plate assembly, to permit lateral insertion of a pipe. The power-transmission arrangement employed includes at least one component that effectively spans the entrance to the channel in the mounting plate so as to ensure that driving engagement therebetween is constantly maintained. Unfortunately, this prior art example does not provide a means for diverting fluid from a cut pipe.

None of the prior art particularly describes a pipe cutter with fluid diverting means. Accordingly, there is a need for a means by which cuts into pipes filled with water can be easily made without the disadvantages as described above. The present invention satisfies such a need by providing an apparatus that is convenient and easy to use, lightweight yet durable in design, and designed for diverting liquids when cutting liquid filled pipes. The pipe cutter cuts through any pipe material and includes a transparent shield that diverts water from the pipe and into a hose attachment. The present invention is simple to use, inexpensive, and designed for many years of repeated use.

SUMMARY OF THE INVENTION

In view of the foregoing disadvantages inherent in the prior art, it has been observed that there is need for a pipe cutter with fluid diverting means.

The present invention comprises a pipe cutter with an integral means of containing and directing water from pipes filled with water. The invention provides a standard, low-profile pipe cutter that is commonly used to cut copper water supply lines. Other cutters designed for PVC, plastic, or other types of piping could also be used. A plastic shield is provide around the entire perimeter of the cutter and extends onto either side. At one end of the plastic shield, approximately 8 to 10 inches from the cutter, the plastic is gathered together and routed to a short section of plastic tubing. At the opposite end of the tubing a standard hose connection piece is provided. To use the invention, the pipe cutter is placed about the pipe where the cut is desired in the normal fashion. Next, the plastic is secured around the cutter and the cut is made. As the cut pierces the pipe wall, any water will spray out, hit the plastic and be routed through the tubing where it can fall into a bucket or be routed away using a conventional garden hose as an extension. The use of the present invention will allow quick tie-ins to water supply piping in finished areas without the disadvantages of water spray, possible ruined walls or the like, in a manner which is quick, easy and effective.

The present invention includes a pipe cutter that is expandable for accommodating different sized ones of the pipe during operating procedures, and a shroud removably surrounding the pipe cutter. Such a shroud is formed from elastically expandable material and includes a receiving end, a dispersing end located opposite of the receiving end, a slit formed in the receiving end of the shroud, and a hose removably attached to the dispersing end of the shroud.

The pipe cutter further includes a mechanism for selectively expanding and contracting a receiving end of the shroud for accommodating a plurality of existing pipes with varying diameters therein during operating conditions. Such a selectively expanding and contracting mechanism includes a hook fastener strip integrally attached to an inner-side edge of the receiving end of the shroud and a loop fastener strip integrally attached to an outer-side edge of the receiving end of the shroud. Such a hook fastener strip and such a loop fastener strip respectively are removably affixed to each other and surrounding the existing pipe is cut during operating conditions.

The pipe cutter further includes a hose connection piece rotatably attached to a dispersing end of the shroud. Such a hose connection piece includes an inner wall with a threaded region formed therein for receiving and cooperating with a threaded region of the hose. The hose connection piece is integrally attached to the dispersing end of the shroud.

The pipe cutter further includes a top half, a bottom half, and a circular cutting element housed within the bottom half. Such a cutting element creates a pipe cut within the existing pipe. The cutter further includes a pin penetrated through the bottom half and the cutting element respectively such that the cutting element is freely rotated about an axis defined by a longitudinal length of the pin. A pivot member is integrally formed in the top half, and the top and bottom halves respectively are pivotally connected by the pivot. An access is formed between the top and bottom halves respectively. Such an access allows the user to interfit an existing pipe to be cut therein during operating conditions. A plurality of rollers is rotatably connected to the top half and is in fluid communication with the access. Such rollers provide for rotation of the pipe interfitted within the access.

A method of utilizing a pipe cutter for directing residual water away from a pipe after the pipe is cut includes the steps of: providing a hose connection piece located at a dispersing end of a shroud; threadably engaging the shroud with the hose; placing an existing pipe through a receiving end of the shroud; placing the existing pipe within an access of the pipe cutter; overlapping an upper inner-side edge of the shroud over an outer-side edge of the shroud by adapting the upper inner-side edge through a slit formed in the shroud; engaging a hook fastener strip with a loop fastener strip and thereby encircling the receiving end of the shroud around the pipe; introducing a quantity of fluid into the shroud; gripping the pipe cutter such that a top half thereof advances inwardly towards a bottom half thereof and thereby reduces a size of the access until the pipe is gripped by a plurality of rollers and a cutting element respectively; rotating the pipe cutter in at least one of a clockwise and a counter clockwise direction respectively until the cutting element cuts through the pipe at the desired position; diverting excess fluid contained within the shroud to the dispersing end of the shroud and to the hose; and removing the pipe from the shroud.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
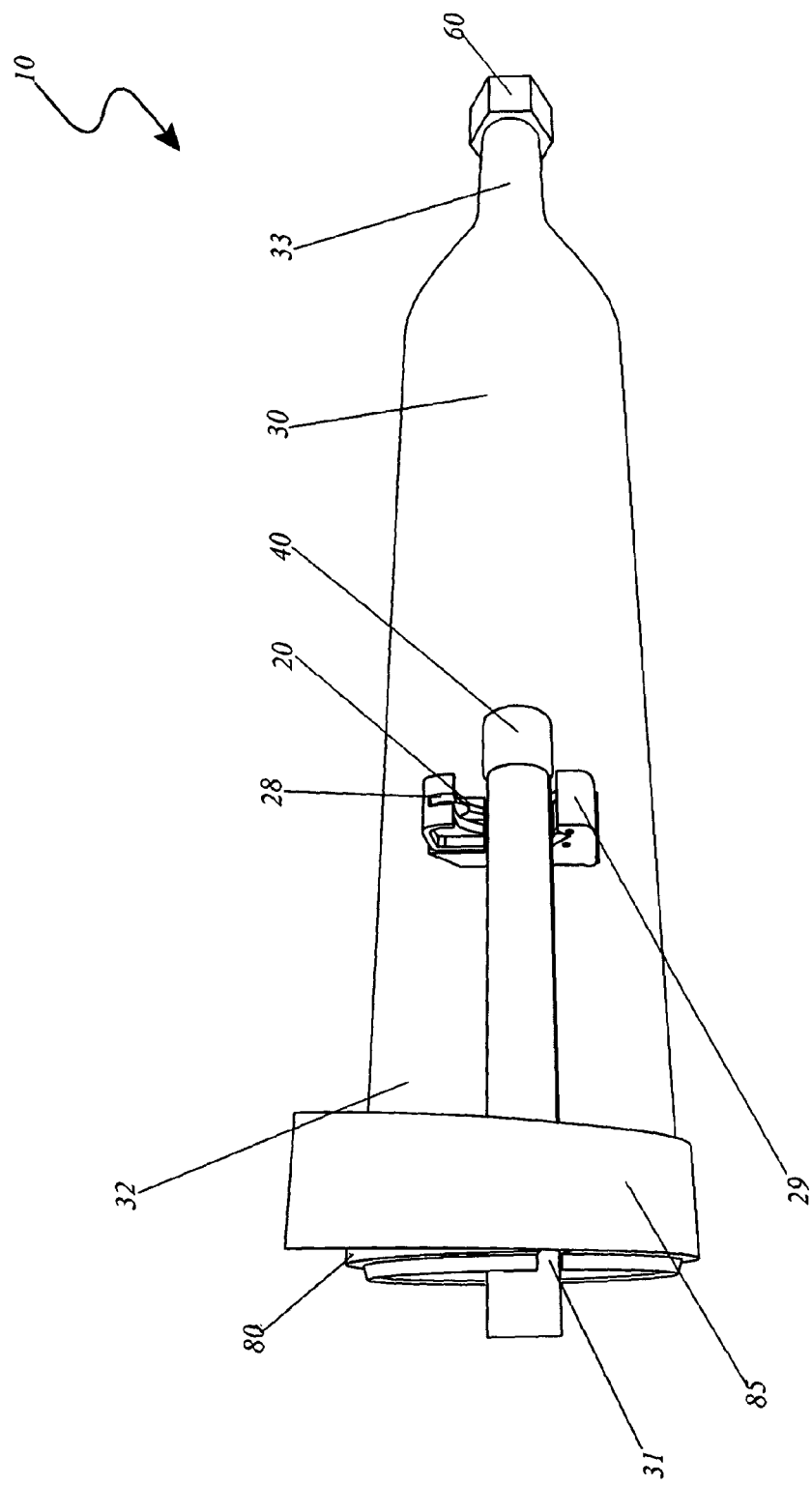
FIG. 1 is a front view of a pipe cutter with fluid diverting means 10 with a shroud 30 closably opened, according to the preferred embodiment of the present invention.

DESCRIPTIVE KEY 10 pipe cutter with fluid diverting means
20 pipe cutter
22 pivot
23 access
24 roller
25 cutting element
26 pin
27 rotation
28 top half
29 bottom half
30 shroud
31 slit
32 receiving end
33 dispersing end
40 pipe
45 cut
50 fluid
60 hose connection piece
65 threaded region
70 hose
80 hook fastener strip
85 loop fastener strip

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method that discloses a pipe 40 cutting device with an integral means of containing and directing residual fluid 50 away from the location of the cut 45 therethrough the pipe 40. The pipe cutter with fluid diverting means (herein described as the "apparatus") 10 comprises a pipe cutter 20, a shroud 30, a hose connection piece 60, and means for selectively expand or contract the receiving end 32 to accommodate the varying diameter size of copper, plastic, and/or polyvinylchloride (PVC) pipes 40. The apparatus 10 is envisioned to be fabricated of plastic, synthetic materials, and/or other durable materials that are tear resistant, high toughness properties, and the capability of functioning in a wide temperature range. A cutting element 25 of a pipe cutter 20 and/or the hose connection piece 60 is envisioned to be fabricated of stainless steel, copper, copper alloy, or other metallic substances that is corrosion resistant.

Figure 2:
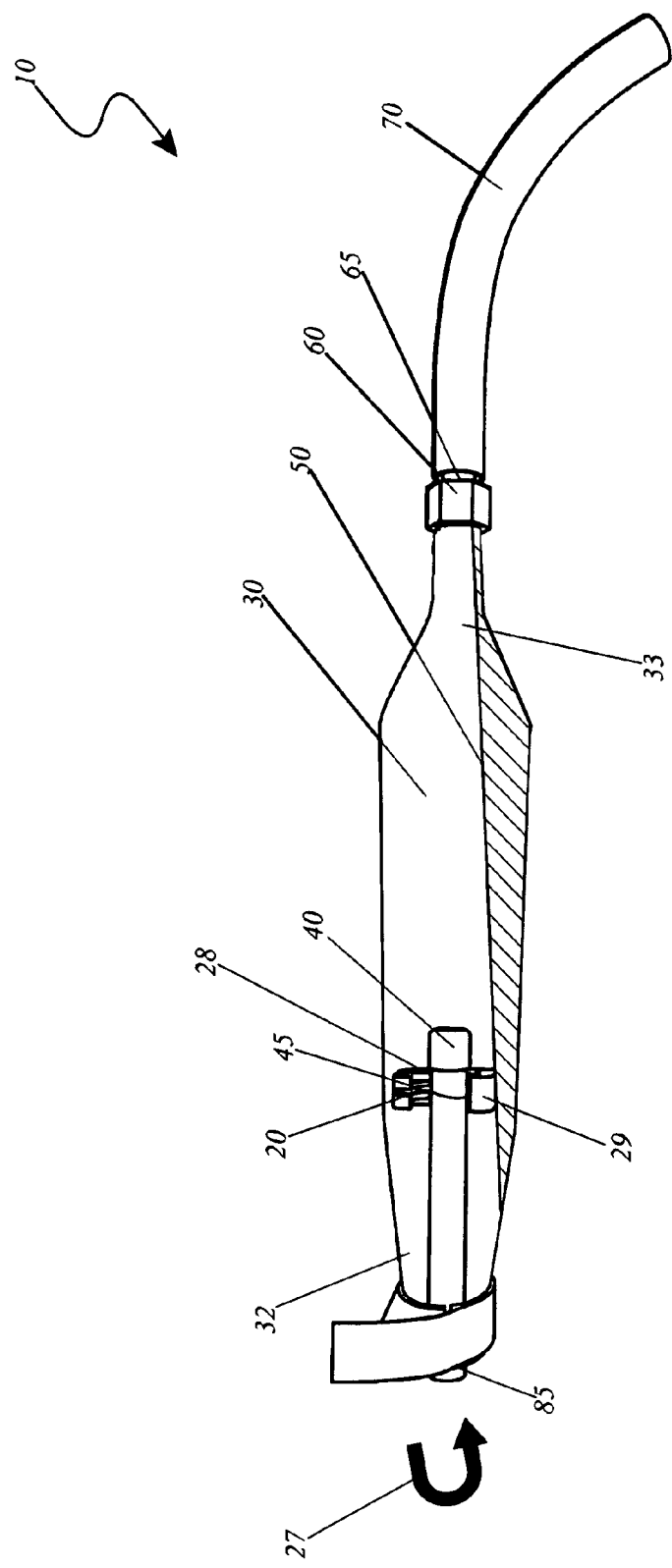
FIG. 2 is a front view of the pipe cutter with fluid diverting means 10 with a shroud 30 openably closed surrounding a pipe 40, according to the preferred embodiment of the present invention.
Figure 3:
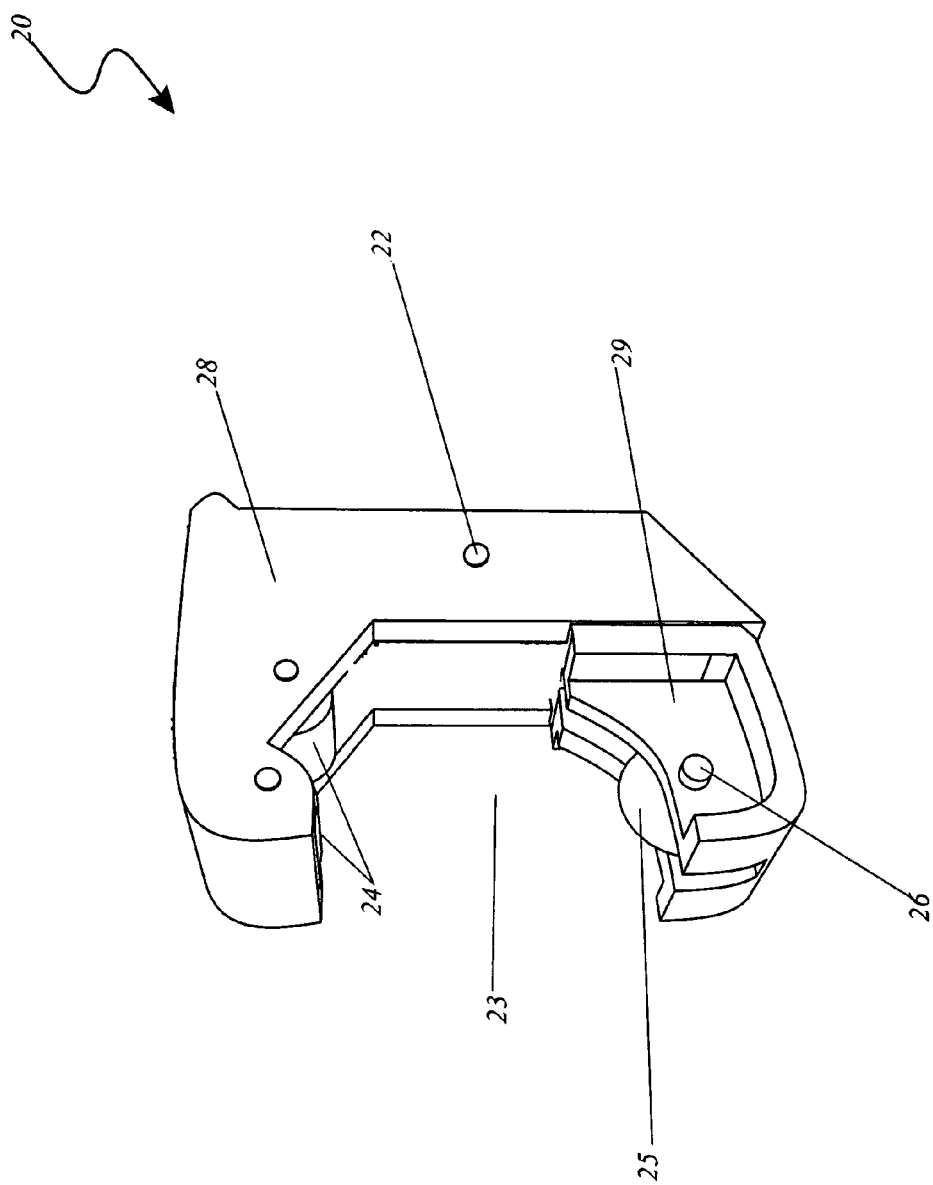
FIG. 3 is a close-up perspective view of a pipe cutter 20 residing therein a shroud 30, according to the preferred embodiment of the present invention.

Referring now to FIGS. 1 through 3, front views of the apparatus 10 and a perspective view of a pipe cutter 20 are disclosed in accordance with the preferred embodiment of the present invention. The apparatus 10 may be sized in a plurality of lengths, widths, and/or other dimensions with varyingly sized pipe cutters 20 integrated therewith. The apparatus 10 is preferably sized to operably accept a pipe 40 of various diameters and thicknesses. A pipe cutter 20 of the apparatus 10 is constituted by a cutting element 25 of varying size and thickness depending on the preferred task that rotates 27 about an axis, preferably parallel to the axis of the pipe 40 to be cut. However, it is further envisioned that the cutting element 25 may be capable of rotating 27 about an axis that is not parallel to the axis of the pipe 40 which, instead of causing a straight plane cut 45, may cause it to cut the pipe 40 at an angle. The cutting element 25 is fixed thereon the pipe cutter 20 via a shaft, fitting, pin 26, or other devices fixedly passed therethrough the center which allow said cutting element 25 to rotate freely about an axis.

The pipe cutter 20 is split on a diametric plane. Two (2) pipe cutter halves 28, 29 are held together by bolts, hinges, pivots 22, or the like assembled through holes to permit pivotal rotation. The pipe cutter 20 comprises rollers 24 each rotatably connected to the top half 28 and a cutting element 25 rotatably connected to the bottom half 29 thereof. Therebetween the two (2) halves 28, 29 is an access 23 to provide an area where the pipe 40 can be suitably secured to be cut by rotating 27 about said pipe 40. The size and shape of the access 23 shall be adjustably sized and formed to match the diameter and size of conventional pipes 40.

The cutting element 25 extends into the access 23, and when rotated 27, said cutting element 25 revolves around the pipe 40 thereby quickly cutting 45 through it due to the biasing force created by the grip of the user. The rollers 24 partially extend into the access 23, and, together with the cutting element 25, provide a support wherein a pipe 40 can be suitably secured to be cut 45. The cutting element 25 with the combination of the rollers 24 secure the pipe 40 within the access 23 with the longitudinal axis of said pipe 40 being substantially coaxial with the axis of rotation 27 of the pipe cutter 20. The biasing forces urge the two (2) halves 28, 29 radially inwardly, thereby urging a portion of the cutting element 25 to extend into the access 23, and substantially, the pipe 40 is secured therein said access 23.

The two (2) halves 28, 29 may be brought together to a diameter substantially equal to the outside diameter of a pipe 40 to encircle said pipe 40 so that the pipe cutter 20 is tangent thereto. The apparatus 10 may then revolve 27 around the pipe 40, and the biasing force placed on the pipe cutter 20 causes the cutting element 25 to gradually cut 45 into and through the pipe 40. The pipe cutter 20 is driven in rotation 27 about the axis of the pipe 40, thereby creating a cut 45 therethrough said pipe 40 transverse thereto.

A user simply compresses downwardly on the pipe cutter 20 thereby biasing the cutting element 25 towards thereto the rollers 24 with a pipe 40 positioned therebetween. The pipe cutter 20 is then rotated 27 about the axis of the pipe 40, thereby penetrating the pipe 40 with each complete rotation 27. The rollers 24 and cutting element 25 clutches the pipe 40 so as to ensure a perfect guiding of said cutting element 25 and its orthogonality with respect to the axis of the pipe 40 especially during rotation 27. The user may willingly tighten the grip of the pipe cutter 20 to slightly advance two (2) halves 28, 29 towards on another radially into the wall of the pipe 40. The depth to which the pipe cutter 20 has cut away the wall of the pipe 40 can be gauged by the position of the cutting element 25. It will be appreciated that other pipe cutter 20 designs may also be used without leaving the scope of the present invention 10.

Figure 4:
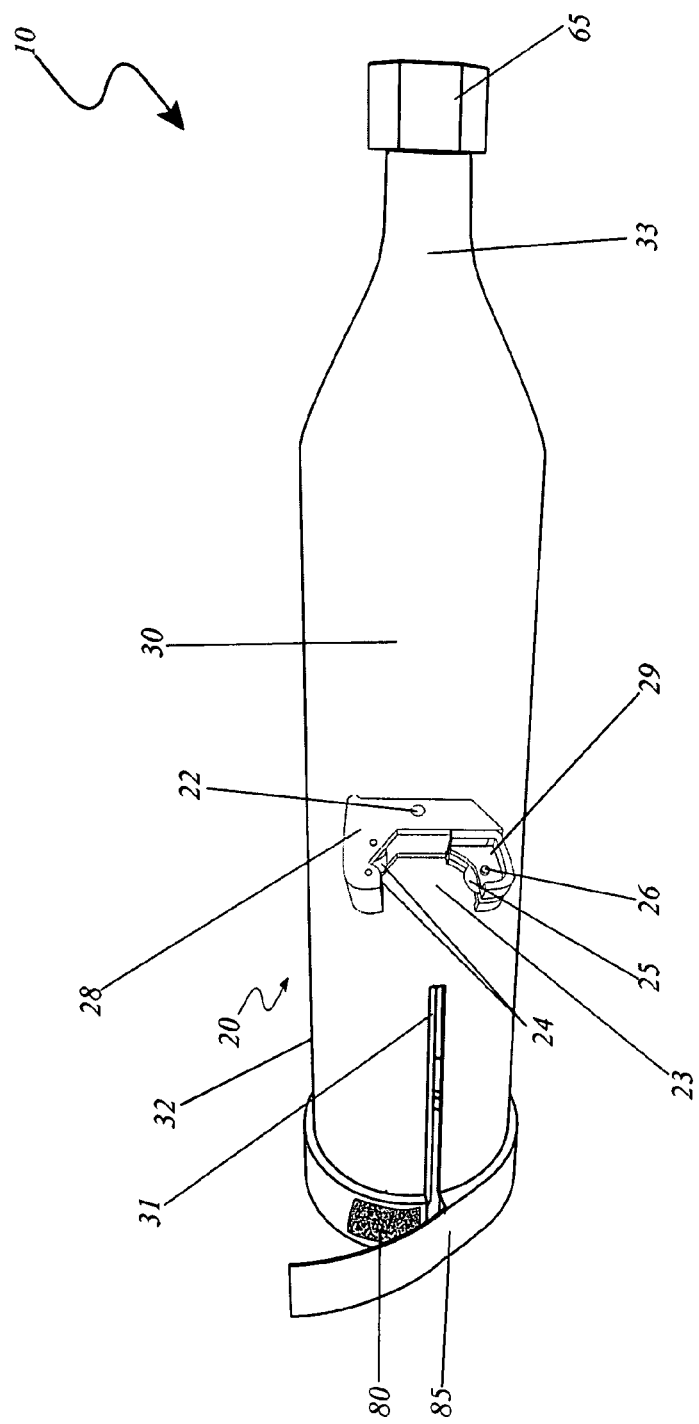
FIG. 4 is a perspective view of the pipe cutter with fluid diverting means 10, according to the preferred embodiment of the present invention; and, FIG. 5 is a rear perspective view of the shroud 30 and hose connection piece 60 with a slit 31 closably opened, according to the preferred embodiment of the present invention.

Referring now to FIG. 4, a perspective view of the apparatus 10 is disclosed in accordance with the preferred embodiment of the present invention. The apparatus 10 comprises a shroud 30 that is transparent or translucent with a receiving end 32 that is elastically expandable and contractible via a slit 31 to adjustably be applied thereon the circumferential surface of a pipe 40 desired to be cut 45 and an opposing end or dispersing end 33 with a hose connection piece 60 integrally attached thereto. The shroud 30 is envisioned to be utilized for the prevention of fluid 50 spraying or leaking outwardly from the cut point 45. The shroud 30 is envisioned to be waterproof thereby removing the risk of the user getting saturated during operation of the apparatus 10.

The shroud 30 defines an interior cavity generally conically shaped for directing fluid 50 away from a receiving end 32 to a dispersing end 33. The receiving end 32 comprises an open face for receiving excess fluid 50 therefrom the pipe 40 and directs said fluid 50 to an interior compartment to the dispersing end 33 to direct fluid 50 away therefrom said receiving end 32 to a hose 70. The receiving end 32 interacts with the dispersing end 33 by means of disintegrating inwardly to regulate a flow of fluid 50 thereto the dispersing end 33 of the shroud 30. The dispersing end 33 is formed at the opposite end of the receiving end 32 defining a conduit that resides in interaction with the receiving end 32 by means of disintegrating inwardly to regulate a flow of fluid 50 therethrough a hose connection piece 60.

The dispersing end 33 is in direct correspondence with the hose 70 thereby dispersing the receiving fluid 50 therein said hose 70. The hose connection piece 60 is operably placed in fluid communication 50 with the shroud 30. The hose connection piece 60 comprises an inner wall defining a threaded or grooved region 65 positioned therein for receiving and cooperating with a threaded or grooved region 65 of a hose 70. The threaded region 65 therein the hose connection piece 60 engages the threaded region 65 of the hose 70 thereby disposing the fluid dispersing end 33 of the shroud 30 at the receiving end of the hose 70. Therefore, a flow path is formed communicating with the receiving end 32 to the dispersing end 33 and finally to the hose 70. Since the shroud 30 is hollow, fluid flow 50 is diverted from the pipe 40 thereto a hose 70 or the dispersing end 33 of said shroud 30. Fluid 50, with the possibility of being pressurized that may otherwise splurge outwardly therefrom the pipe 40, is thus collected by the receiving end 32 and diverted thereto the dispersing end 33 thereby substantially alleviating possible spillage and muddle.

Figure 5:
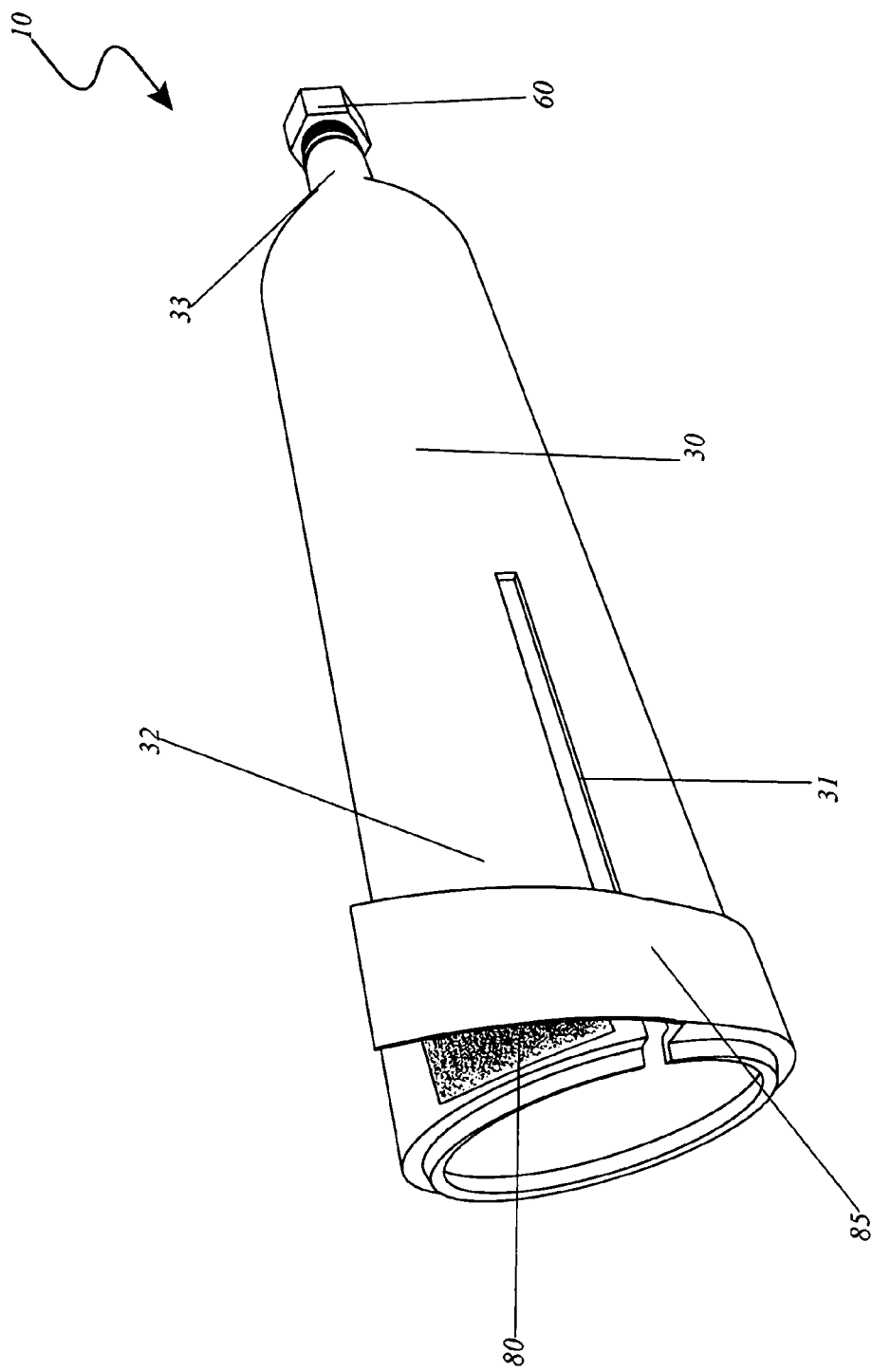

Referring now to FIG. 5, a rear perspective view of the shroud 30 and hose connection piece 60 with the slit 31 closably opened, is disclosed in accordance with the preferred embodiment of the present invention. The receiving end 32 of the shroud 30 is envisioned to expand or contract via the slit 31 to a diameter approximately equal to the outer diameter of a pipe 40, where the apparatus 10 is preferably placed for use. A hook-and-loop fastener assembly 80, 85 is envisioned to be utilized for providing the receiving end 32 leading towards the inside cavity of the shroud 30 to be selectably and openly closed via said hook-and-loop fastener assembly 80, 85. The hook-and-loop fastener assembly 80, 85 comprises a hook fastener strip 80 and a loop fastener strip 85 which mates with each other.

The receiving end 32 comprises a hook fastener strip 80 integrally attached thereto the inner-side edge of said receiving end 32 and a loop fastener strip 85 integrally attached thereto the outer-side edge of said receiving end 32 capable of engaging with the hook fastener strip 80. It will be appreciated that the positions of the hook fastener strip 80 and the loop fastener strip 85 may be interchanged without leaving the scope of the invention 10. The hook-and-loop fastener assembly 80, 85 is adhered, integrated, or otherwise attached thereto the respective inner-side edge and outer-side edge.

The hook fastener strip 80 constitutes the inner-side upper edge of the shroud 30 and is wrapped around the surface of the pipe 40 to decrease the receiving end 32 in the radial direction such to overlap said pipe 40 and engaging thereto the loop fastener strip 85. The receiving end 32 is thereby radially contracted such that the inner-side surface of said receiving end 32 slightly overlaps, that is, such that the hook fastener strip 80 extends beyond at least a portion of the loop fastener strip 85. As a result, the receiving end 32 of the shroud 30 is contracted thus pressing the hook fastener strip 80 onto the loop fastener strip 85. The loop fastener strip 85 selectively attaches thereto the hook fastener strip 80 positioned on the inner-side upper edge thereby enclosing the receiving end 32 about the pipe 40. The loop fastener strip 85 engages the hook fastener strip 80 and, consequently, biasing the receiving end 32 around said pipe 40.

An alternate embodiment of the present invention may disclose a knob or other tightening device to provide the biasing force thereon the two (2) halves 28, 29 with or without spring-loaded forces. The knob would urge the halves 28, 29 radially inwardly, thereby urging a portion of the cutting element 25 to extend into the access 23, and substantially, the pipe 40 secured therein said access 23. Another alternate embodiment of the present invention may disclose a top half 28 without rollers 24. Yet another alternate embodiment of the present invention may disclose alternate temporary fastening means around the receiving end 32 of the shroud 30.

The preferred embodiment of the present invention can be utilized by the common user in a simple and effortless manner with little or no training. The present invention describes a means for cutting a pipe 40 without the heretofore necessity of cleaning excess fluid 50 that may spill or leak outwardly. After initial purchase or acquisition of the apparatus 10, it would be configured as indicated in FIGS. 1 through 5.

The method of utilizing the device may be achieved by performing the following steps: utilizing the hose connection piece 60 at the dispersing end 33 to threadly engage the hose 70, if needed; placing a pipe 40 therethrough the receiving end 32 of the shroud 30; placing the pipe 40 therein the access 23 of the pipe cutter 20; utilizing the slit 31 to overlap the upper inner-side edge over the outer-side edge of the shroud 30; engaging the hook fastener strip 80 therewith the loop fastener strip 85 thereby encircling the receiving end 32 around the pipe 40; gripping the pipe cutter 20 such that the top half 28 advances inwardly towards the bottom half 29 thereby reducing the size of the access 23 until the pipe 40 is gripped by the rollers 24 and the cutting element 25; rotating 27 the apparatus 10 in a clockwise and/or counterclockwise fashion until the cutting element 25 cuts 45 therethrough the pipe 40 at the desired position; and, diverting the excess fluid 50 therein the pipe 40 thereto the dispersing end 33 of the shroud 30 and finally to the hose 70.

First, with excess fluid 50 residing therein the interior of the existing pipe 40, the receiving end 32 is mounted on said pipe 40 via the slit 31 being overlapped and engaging the hook-and-loop fastener assembly 80, 85 by a user in such a manner that the pipe cutter 20 is positioned on the desired cut location 45 of the pipe 40 within the shroud 30. Once the pipe 40 has been inserted into the receiving end 32, fluid 50 may then be redirected away from the pipe cut location 45. The funnel-like shape of the shroud 30 improves direction of fluid flow 50 into the hose 70. After mounting the receiving end 32 of the shroud 30 onto the pipe 40, the apparatus 10 is then rotated 27 in a clockwise or counterclockwise fashion so that the cutting element 25 incrementally advances therein the pipe 40.

The pipe cutter 20 contacts the pipe 40 in an access 23 therebetween the rollers 24 and cutting element 25. A continuous grip onto the pipe cutter 20 will cause the rollers 24 to press down the pipe 40 toward the cutting element 25. At the same time, the pipe 40 is being cut 45 by the cutting element 25. The user can stop the grip and rotation 27 once the pipe 40 has been cut. For larger pipes 40, the user will not have to grip to provide the widest access 23 possible, while, for pipes 40 of smaller diameters, the top half 28 and may be moved inwardly to contact the smaller pipe 40 between the cutting element 25 and the rollers 24 to maintain the longitudinal axis of the pipe 40 substantially coaxial with that of the axis of rotation of the cutting element 25. As the pipe cutter 20 continues to be rotated 27, the cutting element 25 creates an incision 45 in pipe 40. The depth of the incision 45 incrementally increases during continued rotation 27 and biasing force exerted inwardly.

The shroud 30 is for collecting and diverting the residual fluid 50 from the cut location 45 within the pipe 40. The user mounts the pipe 40 therein the shroud 30 via the slit 31 and the hook-and-loop fastener assembly 80, 85 and ensuring fixation of said hook-and-loop fastener assembly 80, 85 together and fixation thereof on the pipe 40 so as to stop residual fluid 50 within said pipe 40 from splurging outwardly. The shroud 30 comprises a receiving end 32 for receiving a fluid 50 from the pipe 40 to be dispensed therethrough to a dispersing end 33 in communication with the hose connection piece 60 that optionally disperses the fluid 50 therethrough a hose 70 or the like. The shroud 30 tapers so as to have a reduced diameter thereto the dispersing end 33 whereby there is formed a means to integrally attach the hose connection piece 60. The hose connection piece 60 is to threadably attach thereto a hose 70 or the like for discharging the excess fluid 50.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A pipe cutter assembly for directing residual water for directing residual water away from a pipe after the pipe is cut, said pipe cutter assembly comprising: a pipe cutter comprising
    a top half;
    a bottom half;
    a circular cutting element housed within said bottom half, said cutting element for cutting said pipe;
    a pin penetrated through said bottom half and said cutting element respectively such that said cutting element is freely rotated about an axis defined by a longitudinal length of said pin;
    a pivot member integrally formed in said top half, said top and bottom halves respectively being pivotally connected by said pivot member;
    an access formed between said top and bottom halves respectively, said access allowing a user to interfit an existing pipe to be cut therein during operating conditions; and, a plurality of rollers rotatably connected to said top half and in fluid communication with said access, said rollers providing for rotation of said pipe interfitted within said access;

a shroud removably surrounding said pipe cutter, said shroud being formed from elastically expandable material, further comprising:

a receiving end;

a dispersing end located opposite of said receiving end;

a slit formed in said receiving end of said shroud; and, a hose removably attached to a hose connection piece;

means for selectively expanding and contracting a receiving end of said shroud for accommodating a plurality of existing pipes with varying diameters therein during operating conditions; and, wherein said hose connection piece is rotatably attached to said dispersing end of said shroud.

2. The pipe cutter assembly of claim 1, wherein said hose connection piece comprises:

an inner wall having a threaded region formed therein for receiving and cooperating with a threaded region of said hose, said hose connection piece being integrally attached to said dispersing end of said shroud.

3. The pipe cutter of claim 2, wherein said selectively expanding and contracting means comprises:

a hook fastener strip integrally attached to an inner-side edge of said receiving end of said shroud; and, a loop fastener strip integrally attached to an outer-side edge of said receiving end of said shroud, said hook fastener strip and said loop fastener strip respectively being removably affixed to each other and surrounding the existing pipe being cut during operating conditions.

4. A pipe cutter assembly for directing residual water for directing residual water away from a pipe after the pipe is cut, said pipe cutter assembly comprising a pipe cutter being expandable for accommodating different sized pipes during operating procedures, comprising:

a top half;

a bottom half;

a circular cutting element housed within said bottom half, said cutting element for cutting said pipe;

a pin penetrated through said bottom half and said cutting element respectively such that said cutting element is freely rotated about an axis defined by a longitudinal length of said pin;

a pivot member integrally formed in said top half, said top and bottom halves respectively being pivotally connected by said pivot;

an access formed between said top and bottom halves respectively, said access allowing a user to interfit an existing pipe to be cut therein during operating conditions; and, a plurality of rollers rotatably connected to said top half and in fluid communication with said access, said rollers providing for rotation of said pipe interfitted within said access;

a shroud removably surrounding said pipe cutter, said shroud being formed from elastically expandable material, further comprising:

a receiving end;

a dispersing end located opposite of said receiving end; and, a slit formed in said receiving end of said shroud; and, a hose removably attached to a hose connection piece;

means for selectively expanding and contracting a receiving end of said shroud for accommodating a plurality of existing pipes with varying diameters therein during operating conditions; and, wherein said hose connection piece is rotatably attached to said dispersing end of said shroud.

5. The pipe cutter assembly of claim 4, wherein said hose connection piece comprises:

an inner wall having a threaded region formed therein for receiving and cooperating with a threaded region of said hose, said hose connection piece being integrally attached to said dispersing end of said shroud.

6. The pipe cutter assembly of claim 5, wherein said selectively expanding and contracting means comprises:

a hook fastener strip integrally attached to an inner-side edge of said receiving end of said shroud; and, a loop fastener strip integrally attached to an outer-side edge of said receiving end of said shroud, said hook fastener strip and said loop fastener strip respectively being removably affixed to each other and surrounding the existing pipe being cut during operating conditions.

* * * * *